Oct. 26, 1954

C. H. SCOTT 2,692,680

SEDIMENT RAKING DEVICE FOR LONGITUDINAL
RECTANGULAR SETTLING TANKS

Filed Oct. 23, 1952

INVENTOR
CHARLES HAROLD SCOTT,
BY William J. Fox
ATTORNEY

Oct. 26, 1954

C. H. SCOTT

2,692,680

SEDIMENT RAKING DEVICE FOR LONGITUDINAL
RECTANGULAR SETTLING TANKS

Filed Oct. 23, 1952

INVENTOR
CHARLES HAROLD SCOTT,
BY William J Fox
ATTORNEY

Patented Oct. 26, 1954

2,692,680

UNITED STATES PATENT OFFICE 2,692,680

SEDIMENT RAKING DEVICE FOR LONGITUDINAL RECTANGULAR SETTLING TANKS

Charles H. Scott, South Norwalk, Conn., assignor to The Dorr Company, Stamford, Conn., a corporation of Delaware Application October 23, 1952, Serial No. 316,360

3 Claims. (Cl. 210—55)

This invention relates to improvements in sediment raking devices or mechanism for use with the longitudinal or rectangular type of settling tank. In such a tank a continuous supply of liquid carrying suspended solids enters at one end thereof, passes longitudinally therethrough while solids settle to the tank bottom, and clarified liquid overflows from the opposite end of the tank, with the sediment raking mechanism meanwhile operating in a longitudinal back and forth movement for conveying the sediment to collection in a discharge zone and for eventual removal therefrom and from the tank.

The sediment raking and collecting mechanism comprises sediment engaging raking elements which operate upon the tank bottom and are carried by a wheeled frame or carriage transversely spanning the tank and operating upon tracks or rails provided at the top of the longitudinal side walls of the tank. Reversible rope drive means move the carriage back and forth upon the tank whereby sediment is being conveyed to the discharge zone.

Further particularized, this invention relates to improvements in the rope drive means for the carriage, whereby each wheeled side of the carriage is to be advanced at the identical speed during its travel from end to end of the tank. In such rope drive means or devices a motor-powered winch or rope drive unit actuates the rope which forms a pulley-supported loop or loop-shaped course extending along each side wall of the tank, so that along respective homologous portions of these two loops the rope travels in the same direction thus moving the carriage bodily upon its tracks, the carriage having its respective wheeled sides fastened to the respective homologous portions of the loops.

That is to say, a single stationary powered drive unit moves the rope in linear direction at identical speeds along the path defined by the respective loops, and thus advances the carriage upon and in proper engagement with its tracks.

The improvements proposed by this invention may be said to represent improvements upon such rope drive means as are exemplified in and by the U. S. Patent to Nels B. Lund, No. 2,101,080. Briefly, and in view of this patent, the improved rope drive means according to this invention may be termed a parallel rope drive mechanism because of the concept of having it engage both sides of the carriage in such a manner as to effect a movement thereof parallel to itself upon the tracks.

However, the manner of operation of the rope drive and hence the proper progress of the carriage itself upon its track, that is progress at a uniform rate and without binding of the wheels relative to the tracks, without side winding, and without slewing, depends upon whether an adequate and substantially uniform tractive tension can be and is maintainable upon the rope portions of the loops attached to the carriage, and also whether the engagement of the rope upon the drive unit proper is of such quality as to provide adequate and continuously uniform frictional contact between the rope and the rope engaging rope winding drums of the drive unit.

Especially, for tanks of great length such as more recently called for by the capacity requirements of degritting chambers for sewage, or of water treatment tanks, there may be experienced in the course of operation unduly great variations in drive rope tension and hence in the quality of frictional contact between the rope and the drive unit proper; for example, alternating thermal expansion and contraction of a rope of such length may become the cause of slippage of the rope upon the drive unit or even of the detachment of some or of all of the rope windings from the grooves of their winding drums, and hence become the cause of failure of the carriage to operate properly upon the tracks or cause its failing to operate at all.

The problem is further pointed up by the fact that at some intermediate temperatures the rope length may be adequate and proper; although at lower temperatures the rope may become excessively taut and strenuous upon the rope itself as well as upon the rope carrying parts of the mechanism, such strain being accompanied by increased power consumption and excessive bearing loads; whereas higher temperatures may produce undue or excessive slackness of the rope even to the extent of putting the apparatus as a while out of commission.

It is among the objects of this invention to provide an efficient and simple combination of a parallel guide rope driving mechanism for the carriage, with rope tension compensating devices whereby drive rope tension of a desired magnitude or order is maintainable to the end of assuring parallel movement of the carriage, while stresses upon the rope and upon the drive unit as well as bearing loads are kept at a minimum.

To this end, the invention provides a rope drive unit disposed stationary at one end of the tank for imparting linear movement to the rope for in turn effecting linear or parallel movement of the carriage. That end of the tank which provides the location of the rope drive unit is herein to be termed the near end, while the opposite end is to be termed the far end of the tank. Accordingly, the corners which are near the drive unit are herein termed the near corners of the tank, whereas the corners at the opposite end of the tank are herein referred to as the far corners of the tank. Similarly, the two loop-shaped sections of the course of the drive rope have a near end and a far end, the far end of each loop-shaped section being defined operatively as by a single corner pulley placed at the respective far corner of the tank, while a pair of corner pulleys placed at a respective near corner of the tank operatively defines the near end of a loop section of the course.

Thus, each longitudinal loop section of the drive rope is defined as by a far end corner pulley about which the rope makes a 360° turn, and also by a pair of near end corner pulleys about which each respective end of the loop makes a 90° turn towards the drive unit which is disposed between the loop sections at the near end of the tank.

While such an arrangement of the drive rope with its two loop sections and its windings upon the drive unit, in effect represents a complete closed or endless course, that complete course may nevertheless for purposes of more convenient definition, be broken down into a pair of complementary sections, the first of which is definable as follows:

Starting at an anchoring point "A" upon one side of the carriage the course of the rope extends longitudinally along the adjacent side wall of the tank to a respective near corner pulley which is one of a pair provided at this corner, then 90° about that pulley to traverse the near end of the tank with the rope frictionally engaged upon the drive unit by way of a first set of rope windings thence to continue to the opposite near corner of the tank and hence to the opposite side wall, thence by way of another 90° swing about one of a pair of near corner pulleys, thence to run horizontally coextensive with the side wall and past the adjacent side of the carriage to and around the respective far end corner pulley and by a 360° turn about that pulley back to the respective side of the carriage to be fastened thereto as at an anchoring point "B" thereof.

The second of the two complementary sections of the course of rope starts from an anchoring point "B" upon the carriage to run on along the adjacent side wall to the second one of the pair of near end pulleys, then by way of a 90° swing about that pulley traversing the near end of the tank with the rope frictionally engaged upon the drive unit by way of a second set of windings, thence to run to the opposite near end corner and the respective second one of the pair of near end corner pulleys, thence by a 90° swing about that pulley to run horizontally coextensive with the adjacent side of the tank wall and past the adjacent side of the carriage and hence past the anchoring point "A" thereon, to and around the respective far end corner pulley and then by way of a 360° turn about that pulley back to the adjacent side of the carriage to be fastened thereon as at the initially mentioned anchoring point "A" thereof.

The drive unit proper operates to impart linear movement at an identical rate to each of the loop-shaped sections of the rope, so that thereby the carriage may be advanced properly along its tracks.

This invention, in order to compensate for excessive slackness as well as for excessive tautness in the loop-shaped sections of the rope system, proposes that each pair of near end corner pulleys be mounted upon an auxiliary frame and that this frame in turn be movable horizontally and that both frames be urged automatically to execute compensatory movements incident to thermal lengthening or shortening of the rope.

According to one feature, the pulley-carrying auxiliary frames are movable in the longitudinal direction of the tank, and a tension correcting force being imparted to the frames by means of a suspended weight operatively connected to both frames in such a manner as to exercise a horizontal outwardly directed pull upon each auxiliary frame. More specifically, this suspended weight is attached to the outer or lower free end of a linear flexible force transmitting element which imparts a constant torque to a torque member defined by a stationary axis of rotation and interposed between the two pulley-carrying auxiliary frames. A pair of linear flexible connectors connects these auxiliary frames with the torque member in such a manner that the torque externally applied to the system by the weight, is absorbed through the torque member by the torque resistance from the two linear connectors, thus applying a corrective rope-tensioning pull to each of these auxiliary frames.

It is among the advantages derived from the operation of this tension-compensating device that it responds automatically to compensate for uneven load resistance encountered by the respective sides of the carriage, in the sense that when the one side of the carriage encounters greater resistance than the other, threatening to interfere with proper parallel progress of the carriage, then the tension-compensating device acts to exert a correspondingly greater corrective pull upon that side of the carriage which encounters the greater resistance. Such uneven condition might be due for example to uneven load resistance encountered by a raking means, or else due to uneven resistance encountered by the respective sides of the carriage upon the respective tracks.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figures 1, 2:
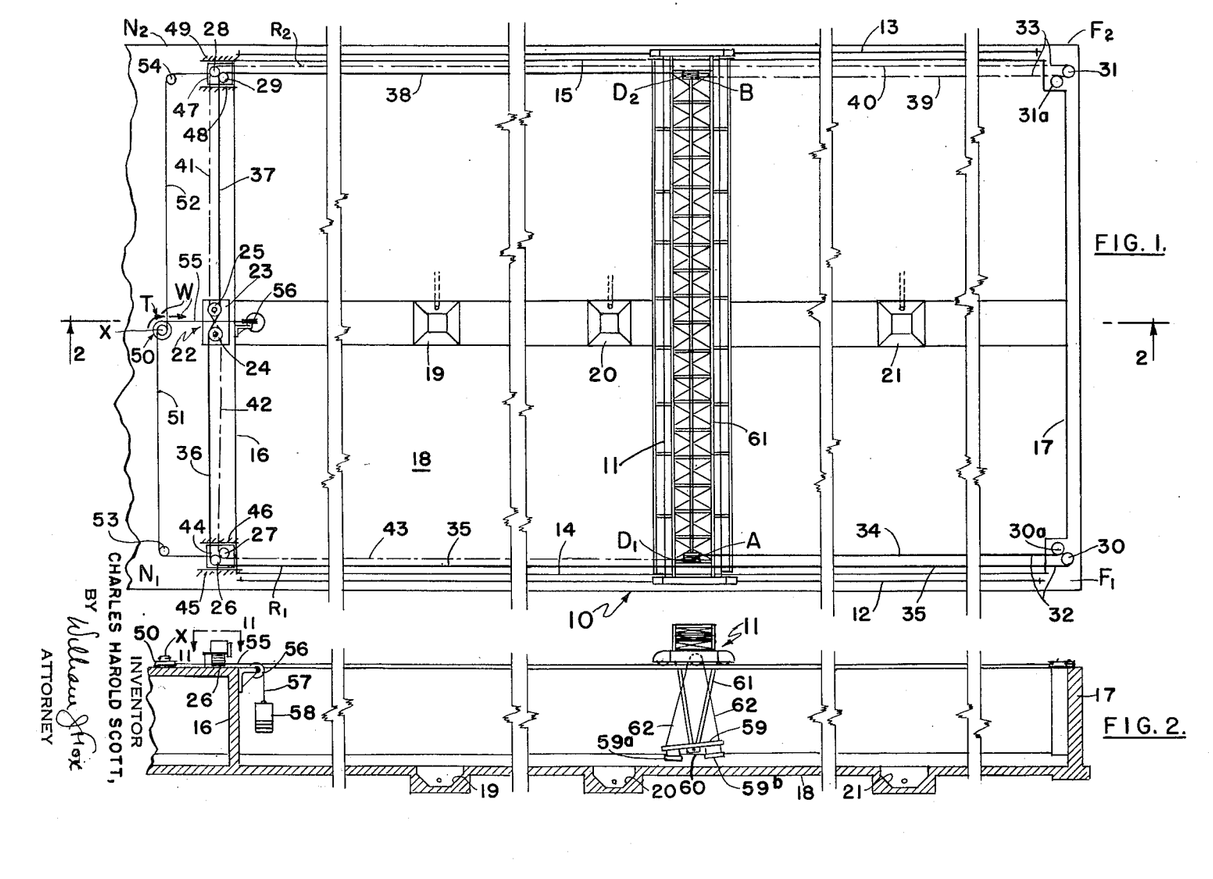
Figure 1 is an overall plan view of the settling tank with the structure of the rope tension compensating device indicated diagrammatically.
Figure 2 is a longitudinal sectional view taken on line 2—2 of Figure 1.

The overall view of the settling tank as equipped with the improved rope drive system or mechanism of this invention appears in Figures 1 and 2, there being the longitudinal tank structure proper as indicated by the numeral 10, the wheeled rake-carrying carriage frame or carriage 11 transversely spanning the tank and reciprocable between the ends of the tank upon a pair of rails indicated at 12 and 13 at the top of the respective sides of the tank, and a rope drive system for reciprocating the carriage frame upon its tracks.

The tank structure 10 comprises a pair of side walls 14 and 15, and walls 16 and 17, and a bottom 18 provided with a number of sludge discharge sumps indicated at 19, 20 and 21 and disposed in and along a longitudinal central zone of the tank bottom. For the purpose of this invention, that end of the tank which is represented by the end wall 16 is herein termed the near end of the tank for the reason that it furnishes the locality for the drive unit proper of the improved drive rope system, while the opposite end represented by the end wall 17 is herein termed the far end of the tank. Consequently, the tank is further defined as by a pair of near end corner portions or corners "N₁" and "N₂," and by a pair of far end corner portions or corners "F₁" and "F₂."

The rope drive system as indicated in the overall views of Figures 1 and 2 comprises a stationary motorized rope drive unit 22 disposed at the near end of the tank and thus at the top of end wall 16 thereof. This drive unit 22 is here indicated as by a base or base member 23, a pair of rope winding drums 24 and 25 engaged by 8-shaped windings of the rope (see also Figure 3) for rotating the drums 24 and 25 in directions opposite to each other.

As part of the rope drive system there are provided a first pair of rope guiding corner pulleys disposed at the near end corner "N₁" and herein termed the near end corner pulleys 26 and 27, and a second pair of rope guiding corner pulleys disposed at the near end corner "N₂" of the tank and herein termed the near end corner pulleys 28 and 29. At the far end of the corner F₁ of the tank the rope drive system comprises a first single rope guiding pulley herein termed the far end pulley 30, while at the far end corner F₂ there is provided a second single rope driving pulley herein termed the far end corner pulley 31. Companion pulleys 30ᵃ and 31ᵃ are associated with pulleys 30 and 31 respectively.

Hence, the location of these various rope guiding pulleys defining the course of the drive rope as a whole, namely as comprising a pair of loop-shaped sections or loops 32 and 33 extending along respective sides 14 and 15 of the tank. The loop 32 as defined by pulleys 26 and 30 is attached to the carriage frame 11 at what is herein termed the anchoring point "A," while the loop 33 defined by pulley 28 and 31 is attached to the carriage frame 11 by what is herein termed as the anchoring point "B." In other words, the respective wheeled sides of the carriage frame 11 are attached to the homologous portions of the respective loops 32 and 33 of the rope for effecting the proper bodily movement of the carriage upon its tracks incident to the operation of the rope drive system.

The complete course of the drive rope may be defined more precisely as the sum total of the complementary rope sections $R_1$ and $R_2$ which are distinguished from each other by being shown in full-line and in dot-and-dash line respectively in Figure 1.

The first rope section $R_1$ (in full-line) of the total course of the drive rope is defined as follows:

Starting from anchoring point "A" on carriage 11, the rope extends along side wall 14 of the tank to and about the far end corner pulley, thence back the length of side wall 14 and onto and about the near end corner pulley 26, thence transversely of the tank to the rope drive unit 22 and into frictional engagement with the drums 24 and 25 thereof as by way of a number of 8-shaped windings (herein termed the first group of 8-shaped windings), thence to and about the near end pulley 29, then by a turn of about 90° to continue along the side wall 15 to the anchoring point "B" on carriage 11. Thus, the first rope section $R_1$ represents the sum total of a series of component lengths, namely the length 34 extending from anchoring point "A" to pulley 30, the length 35 extending from pulley 30 to pulley 26, the length 36 extending from pulley 26 to the rope drive unit 22, the length represented by the first group of 8-shaped rope windings upon drums 24 and 25, the length 37 extending from the drive unit 22 to the pulley 29, and finally the length 38 extending from the pulley 29 to the anchoring point "B" upon the carriage 11.

The second or complementary rope section $R_2$ (in dot-and-dash line) in the total course of the drive rope is defined as follows:

From the anchoring point "B" on carriage 11 the rope extends along the side wall 15 of the tank to and about the far end corner pulley 31 thence back the length of side wall 15 and onto or about the near end corner pulley 28, thence transversely of the tank to the rope drive unit 22 and into frictional engagement with the drums 24 and 25 by way of a number of 8-shaped windings (herein termed the second group of 8-shaped winding) then from the drive unit 22 to and about the near end corner pulley 27, and thence to the anchoring point "A" on carriage 11.

Thus, the second rope section $R_2$ represents the total of component lengths namely the lengths 39 extending from anchoring point "B" to pulley 31, the length 40 extending from pulley 31 to pulley 28, the length 41 extending from pulley 28 to rope drive unit 22, the length represented by the second group of 8-shaped windings upon drums 24 and 25, the length 42 extending from drive unit 22 to pulley 27, and finally the length 43 extending from pulley 29 to anchoring point "A" on carriage 11.

There will now be described a rope tension compensating device such as is summarily designated by the letter "T" in Figure 1. The basis for the functioning of this compensating device lies in the provision of means for mounting each pair of near end corner pulleys upon an auxiliary frame or structure which is capable of compensatory movement along a guided path incident to the lengthening or shortening of the drive rope, such as may occur as a result of the initially mentioned thermal influences upon the rope. The device "T" applies an outward pull in the longitudinal direction of the tank to each of the two auxiliary slidable frame structures.

As this description proceeds, it will furthermore be seen that the compensating device will act correctively to apply to each side of the carriage that amount of pull which is necessary to make up for any uneven loading of the carriage or any unequalities in the resistance offered to the movement of the carriage at each respective side thereof, in such a manner that parallel guidance is maintained in the progress of the carriage.

The first pair of near end corner pulleys 26 and 27 is mounted upon an auxiliary frame indicated at 44 with a pair of stationary parallel guides indicated at 45 and 46 for the frame 44 to be movable or slidable in the longitudinal direction of the tank, while the second pair of near end corner pulleys 28 and 29 are mounted upon an auxiliary frame 47 with a pair of stationary parallel guides indicated at 48 and 49 for the frame 47 to be movable in the longitudinal direction of the tank.

The outward pull on each of the auxiliary frames 44 and 47 is provided by a weighted torque member 50 turnable about a vertical axis "X" and having a pair of linear flexible force-transmitting connections or elements 51 and 52 leading from the torque member 50 by way of pulleys 53 and 54 to points of attachment upon the auxiliary frames 44 and 47 respectively; a third linear flexible force-transmitting connection or element 55 leads from the torque member 50 to and over a pulley 56 so as to have its free downward end 57 loaded by a weight membr 58. The pulling force of the thus suspended weight member 58 is transmitted to both auxiliary frames 44 and 47 in that it tends to turn the torque member 50 in the direction of arrows "W," which tendency or torque is absorbed counter-torque wise by the transmitting elements 51 and 52.

For the purpose of defining this drive rope system it has been stated above that the loop-shaped sections 32 and 33 thereof have anchoring points "A" and "B" where homologous portions are attached to respective side portions of the carriage. Mor precisely, the attachment is such that the pull of the rope upon the carriage is utilized for automatically controlling the reversal of a double-acting raking member 59 which is tiltably mounted as at 60 upon a structure 61 which extends downwardly from the carriage 11 in rigid connection therewith and hence may be considered as a part thereof.

The construction and function of the reciprocating raking means herein indicated are known from prior art, hence it will suffice to say that the raking member 59 has at one end thereof a set of plough-like inclined raking blades 59$^a$ and at the end a set of such raking blades 59$^b$, which sets of blades are attached to become alternatingly effective depending upon the direction of movement of the carriage, so that with each movement of the carriage from one end to the other of the tank, sediment upon the tank bottom will be urged towards and finally into the longitudinal center zone of the tank for delivery into and discharge from the sumps 19, 20 and 21 located in this longitudinal zone.

The raking member 59 is tiltable by the rotation of a shaft 61 mounted upon the carriage frame and extending from side to side thereof, with flexible motion transmitting means 62 operatively interconecting the outer ends of the raking member 60 by way of the shaft 61 in such a manner that rotation of the shaft will tilt the raking member 59 to render the respective blades 59$^a$ and 59$^b$ alternating operatively with respect to engaging the sediment upon the tank bottom. The tilting of the raking member 59 to be in proper timing with the point of reversal of the direction of the carriage movement, is adjusted by the pull of the drive rope itself, in that the anchoring point "A" and "B" in fact are represented by a pair of rope engaging drums $D_1$ and $D_2$ fixed upon shaft 61, whereby the pull of the drive rope will tilt the rake member 59 every time that the rope drive unit 22 reverses the direction of travel of the carriage and has left one end of the tank.

A more diagrammatic plan view of the rope drive system (in Fig. 3) presents the course of the drive rope more clearly even though more diagrammatically. Especially, in this diagrammatic showing of the system there is discernible more clearly the manner in which the drive rope engages the two drums of the rope drive unit by way of 8-shaped windings "S" the showing of which is rendered extremely clear by omitting the showing of the drive unit itself upon which these windings are engaged.

Figure 3:
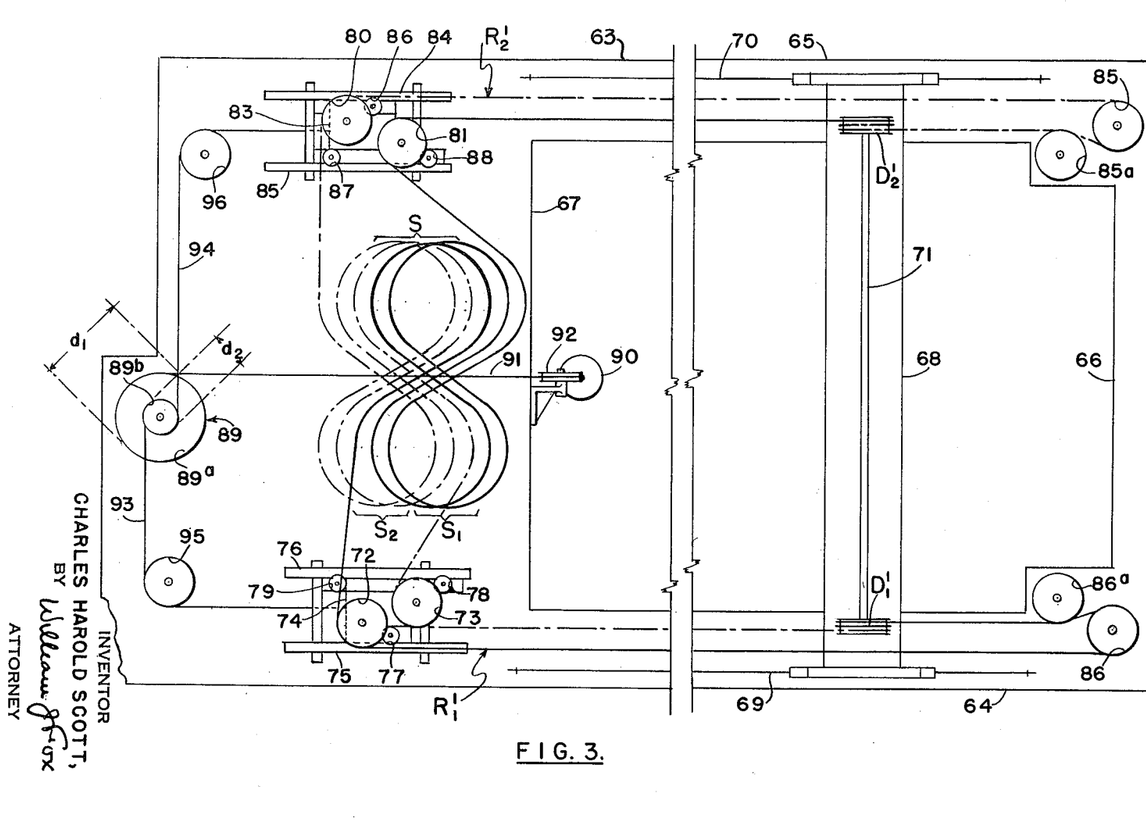
Figure 3 is an enlarged plan view of the rope drive system diagrammatically shown.

Figure 3 has diagrammatically indicated therein structural parts or elements discernible as equivalents of those described above in Figures 1 and 2. In other words, there is a tank 63 having side walls 64 and 65 as well as end walls 66 and 67. The reciprocable carriage supporting the sediment raking means is indicated at 68 to be operable upon a pair of tracks indicated at 69 and 70 upon the side walls of the tank. The rake actuating shaft is indicated at 71, and its operative connection with the drive rope is shown by a pair of drums $D_1'$ and $D_2'$ fixed upon each end of the shaft.

One pair of rope-guiding near-end corner pulleys 72 and 73 is carried by an auxiliary frame 74 which is horizontally movable in the longitudinal direction of the tank, namely as between a pair of parallel fixed guide rails 75 and 76 engaged by a set of guide rollers 77, 78 and 79 mounted upon auxiliary frame 74. Similarly, the opposite pair of rope-guiding near-end corner pulleys is indicated at 80 and 81 carried by the auxiliary frame 83 which is movable horizontally in a direction substantially parallel to that of auxiliary frame 74, namely as between a pair of parallel fixed guide rails 84 and 85 engaged by a set of guide rollers 86, 87 and 88 mounted upon auxiliary frame 83.

Correspondingly, one of the rope guiding far-end single pulleys is indicated at 85, and the other at 86, together with their companion guide pulleys 85$^a$ and 86$^a$ respectively, all far-end rope guiding pulleys being mounted stationary at the top of the tank.

Again, in the complete course of the drive rope there are discernible two main component sections $R_1'$ (shown in full-line) and $R_2'$ (shown in dot-and-dash). Starting at its anchoring point on drum $D_1'$ the component rope section $R_1'$ extends along part of the side wall 64 of the tank to and around the single far-end pulley 86, back along the length of side wall 64 to and around the near-end pulley 72, thence transversely of the tank at the near-end thereof to and into engagement with the rope drive unit (which itself is here not shown) to engage the same by way of a first group "$S_1$" of 8-shaped rope windings, thence to pass onto and around the near-end corner pulley 81, and thereafter along part of the side wall 65 to the anchoring point on drum $D_2'$ on the carriage 68.

The component section $R_2'$ of the drive rope, starting from its anchoring point on drum $D_2'$, extends along part of the side wall 65 of the tank to and around the single far-end corner pully 85, back along the length of side wall 65 to and around the near-end corner pulley 80, thence transversely of the tank at the near-end thereof to into engagement with the rope drive unit (which itself is here not shown) engaging the same by way of a second group "$S_2$" of 8-shaped rope windings thence to pass onto and around the near-end corner pulley 73, finally along part of the side wall 64 to the anchoring point on drum $D_1'$ on carriage 68.

The rope tension compensating device is discernible by reason of a torque member 89 having a portion 89$^a$ of large diameter $d_1$ and a portion 89$^b$ of small diameter $d_2$. The torque imparting weight member indicated at 90 is suspended by means of a linear flexible element 91 carried by pulley 92, which flexible element 91 is attached to the torque member 89 at the periphery of the large diameter portion 89$^a$ thereof. The torque thus imposed by weight member 90 upon torque member 89 is absorbed or balanced countertorquewise by a pair of linear flexible connectors 93 and 94 being carried by pulleys 95 and 96 respectively, and having their opposite ends attached to diametrically opposed points at the periphery of the small diameter portion 89$^b$ of torque member 89, the two connectors 93 and 94 having their opposite outer ends fastened to the auxiliary frames 74 and 83 respectively.

Figure 4:
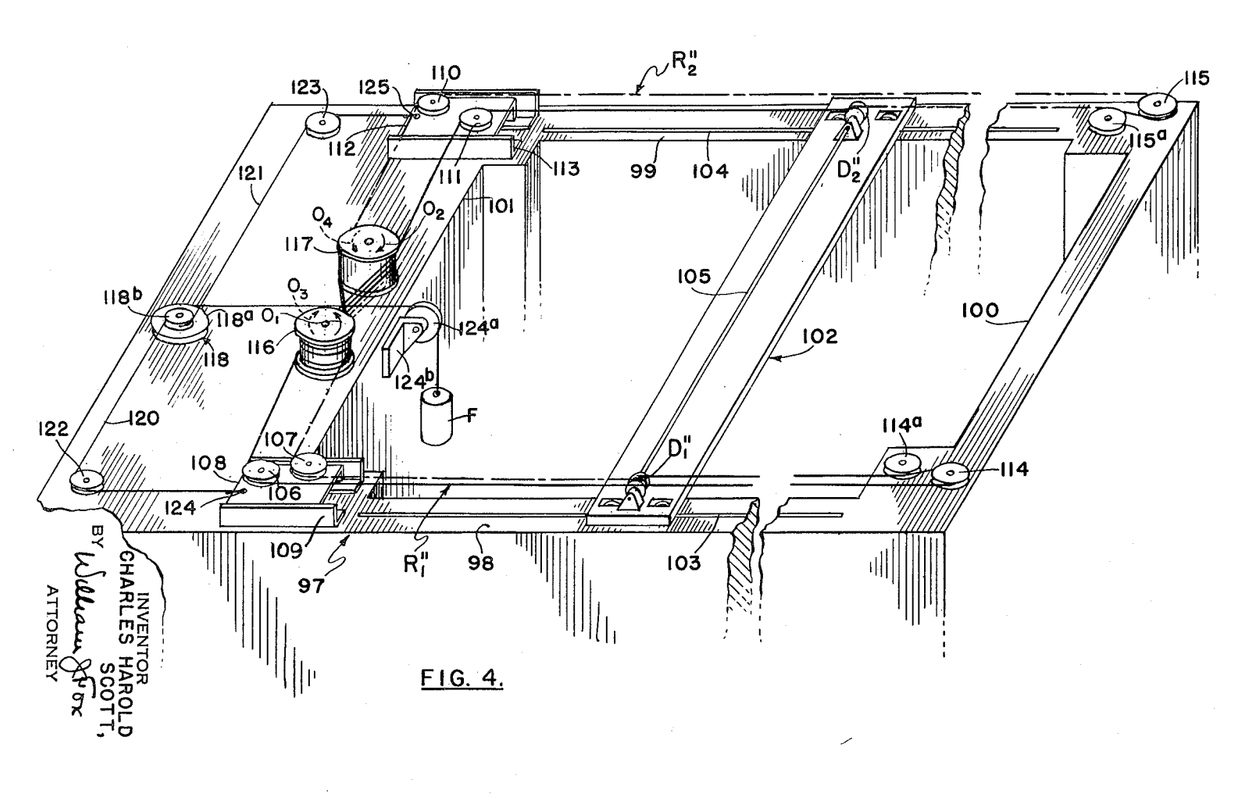
Figure 4 is a perspective although diagrammatical structural view of the tank with rope drive system and rope-tension compensating devices therefor.

The foregoing description of the rope drive system as shown in Figures 1, 2, and 3 furnishes, a prima facia ready understanding of the rope drive system further illustrated in perspective view in Figure 4. This perspective view shows the tank designated by numeral 97 having side walls 98 and 99 as well as end walls 100 and 101. The reciprocable carriage is indicated at 102 operating on a pair of rails 103 and 104. The shaft upon the carriage is designated by the numeral 105 and carries fixed upon the respective end portions thereof the drums $D_1''$ and $D_2''$. The one pair of rope guiding near-end corner pulleys of the system is designated by numerals 106 and 107 which pulleys are shown to be carried by an auxiliary frame 108 which is horizontally movable in the longitudinal direction of the tank, namely in a guide structure 109, while the other pair of rope guiding near-end corner pulleys designated by numerals 110 and 111 is shown to be carried by an auxiliary frame 112 movable in a direction parallel to that of auxiliary frame 108, namely by means of a guide structure designated by the numeral 113. The two rope guiding far-end corner pulleys are designated as by numerals 114 and 115 respectively and have companion guide pulleys 114$^a$ and 115$^a$ respectively. The rope drive unit proper is here indicated only by the showing in perspective view of the two rope driving drums 116 and 117 representing part of the stationary rope drive unit 22 (of Figs. 1 and 2) which drive unit is moreover clearly shown in the greatly enlarged detail views of Figures 11 and 12. The rope driving drums 116 and 117 are driven to rotate in directions opposite to each other namely in the direction of full-line arrows $O_1$ and $O_2$ for moving the carriage in one direction or to rotate in the direction of dotted-line arrows $O_3$ and $O_4$ respectively for moving the carriage in the opposite direction.

The total course of the (Fig. 4) drive rope again presents one component section $R_1''$ (in full-line) the compensatory component section $R_2''$ (in dot-and-dash line) for moving the carriage back and forth between the ends of the tank. The component section $R_1''$ starts from its anchoring point on drum $D_1''$, extends along a part of the side wall 98 to and around the far-end corner pulley 114, then back along the length of side wall 98 to and around the near-end corner pulley 106, thence transversely along the near end of the tank to and into engagement with the rope driving drums 116 and 117 so as to constitute thereon the first group of 8-shaped rope windings (such as indicated as $S_1$ in Fig. 3), thence to and around the near-end corner pulley 111, and on along part of the side wall 99 to the anchoring point on drum $D_2''$ on the carriage 102. The other component section $R_2''$ of the (Fig. 4) drive rope starts from its anchoring point on drum $D_2''$, extends along a part of the side wall 99 to and around the far-end corner pulley 115, then back along the length of side wall 99 to and around the near-end corner pulley 110, thence transversely along the near-end of the tank to and into engagement with the rope driving drum 116 and 117 so as to constitute thereon the second group of 8-shaped rope windings (such as indicated at $S_2$ in Fig. 3), thence to and around the near-end corner pulley 107 and on along part of the side wall 98 to the anchoring point of drum $D_1''$ on the carriage 102.

The rope tension compensating device in the perspective view of Figure 4 is now also readily identifiable, namely as comprising a torque member 118 having a large diameter portion 118$^a$ and a small diameter portion 118$^b$, with a weighted torque imparting flexible linear element 119 attached peripherally to the large diameter portion 118$^a$, and a pair of torque absorbing flexible linear connectors 120 and 121 being carried by pulleys 122 and 123 respectively, the outer ends of these connectors being fastened as at 124 and 125 to respective auxiliary frames 108 and 112. The torque imparting force is represented by the weight "F" suspended by the linear element 119 engaging a pulley 124$^a$ carried by a bracket 124$^b$ upon the top portion of end wall 101 of the tank.

The description according to Figures 1, 2, 3 and 4 presenting the drive rope system as a whole, will now be supplemented by a more detailed description of structural components (see Figs. 5 to 10) pertaining to the rope tension compensating device as shown in Figure 4, as well as by a more detailed description (see Figs. 11 and 12) of the rope drive unit 22 indicated in Figures 1 and 2.

Figures 5, 6, 7, 8, 9, 10:
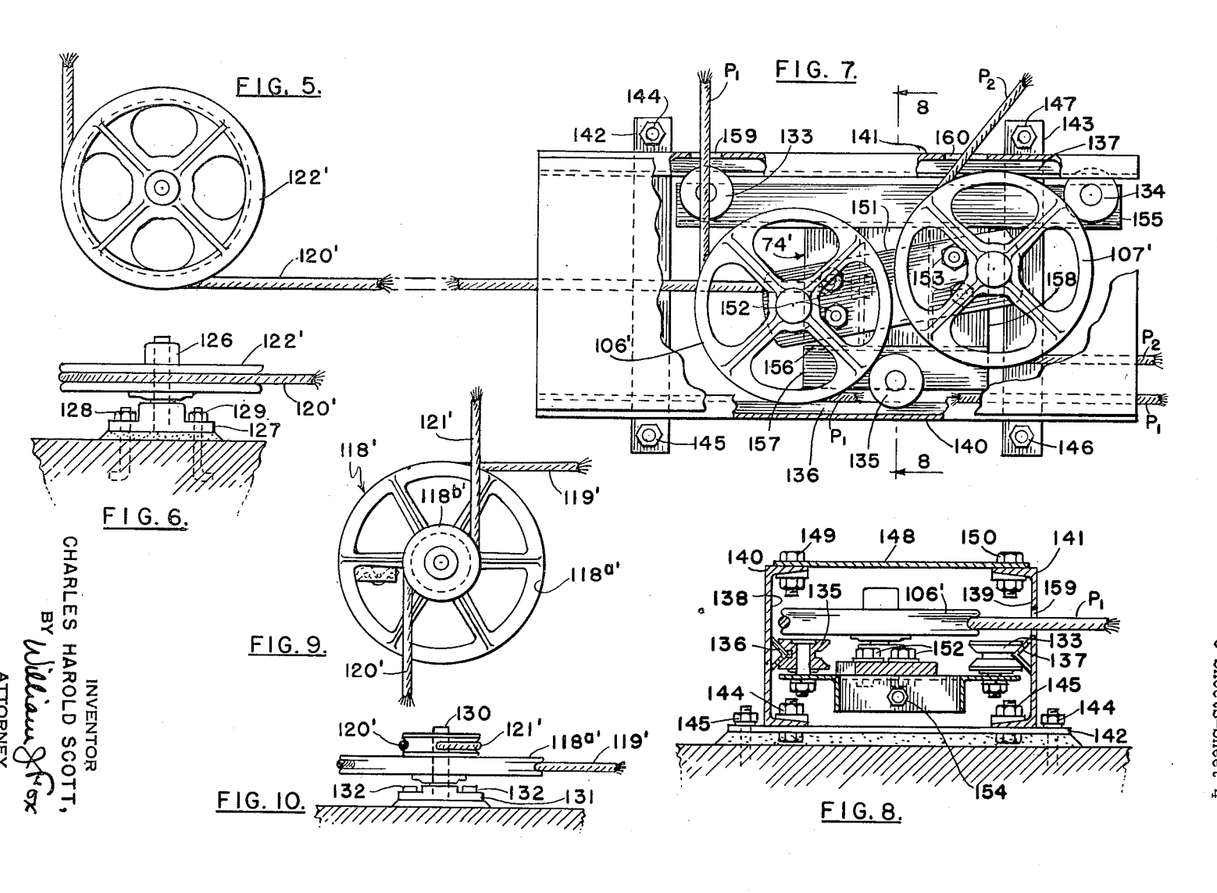
Figure 5 shows the enlarged structural detail in plan view of a rope carrying pulley of the drive rope system.
Figure 6 is a side view of pulleys of Figure 5.
Figure 7 is an enlarged and more detailed plan view of the structure of one of the pulley-carrying movable guided auxiliary frames diagrammatically indicated in Figures 1, 3 and 4.
Figure 8 is a cross-sectional view taken on line 8—8 of Figure 7.
Figure 9 is a plan view of the rotary torque member functionally disposed between the weight means and the two auxiliary pulley-carrying frames.
Figure 10 is a side view of the torque member shown in Figure 9.

Figure 5 shows a pulley 122' engaged by a linear force transmitting element 120' (corresponding to pulley 122 and linear element 120 in Fig. 4); Figure 6 shows the pulley 122' rotatable about a vertical pivot 126 having a base member 127 held stationary as by anchoring bolts 128 and 129 upon the top of near-end portion of the tank.

Structural details of the Figure 4 torque member 118 are represented in and by Figures 9 and 10 where the torque member 118' has a large diameter portion 118$^{a'}$ engaged by a linear flexible weighted torque imparted member 119', and has a small diameter portion 118b' engaged by linear flexible connectors 120' and 121' (corresponding to connectors 120 and 121 of Fig. 4). This torque member 118' is rotatable about a pivot 130 having a base 131 held stationary upon the top of the tank structure as by anchoring bolts 132.

Figure 7 represents structural details for mounting the near-end corner pulleys 26 and 27 of Figure 1. The greatly enlarged detailed structure of Figure 7 comprises an auxiliary frame 74' (corresponding to auxiliary frame 108 of Fig. 4) here shown to be in the form of a composite welded structure consisting of several lengths of steel angle profiles but welded together to constitute the frame. This frame provides a mounting for a set of three grooved guide rollers 133, 134, 135 (corresponding to guide rollers 77, 78, 79 of Fig. 3) disposed in triangular fashion in that the rollers 133 and 134 define the base and the roller 135 defines the apex of a triangle. These guide rollers engage a pair of parallel guide rails 136 and 137, with the roller 135 at the apex of the triangle engaging rail 136 and the rollers 133 and 134 at the base of the triangle engaging rail 137.

The horizontal guide rails 136 and 137 are carried by and fastened or welded to the respective inner faces 138 and 139 of a pair of vertical blades as represented by the vertical web portions of a pair of channel irons 140 and 141. These channel irons 140 and 141 are interconnected at the bottom by means of a pair of flat steel bars 142 and 143 fastened to the bottom ends of the channel irons 140 and 141 as indicated by bolts 144 and 145 (see Fig. 8), the flat steel bars 142 and 143 in turn being fastened to the top of the tank structure as by means of anchor bolts 144, 145, 146, 147 (see Fig. 7). The top ends of the channel irons 140 and 141 have rigidly connected thereto a top cover plate 148 (partly broken away) as by means of bolts indicated at 149 and 150 in Figure 8.

A pair of near-end corner pulleys 106' and 107' (corresponding to pulleys 106 and 107 in Fig. 4) are rotatably mounted upon the auxiliary frame 74' as by means of a common elongated horizontal base member 151 fastened to the top face of the auxiliary frame 74' as by means of bolts 152 and 153. The pulley 106' is engaged by a part P₁ of the drive rope, which part corresponds to the rope section R₁'' of Figure 4, while pulley 107' is engaged by a part P₂ of the drive rope which part corresponds to the rope section R₂'' of Figure 4. A linear flexible connector 120' (corresponding to connector 120 of Fig. 4) is fastened to the auxiliary frame 74' as at 154 (see Fig. 8) which corresponds to the point of attachment 124 in Figure 4.

From the showing in Figures 7 and 8 it will be seen that the horizontally guided auxiliary frame 74' is here shown to be in the form of a welded composite structure consisting of several lengths of angle iron but welded together namely, a long angle iron 155, a medium length angle iron 156 standing parallel to angle iron 155 and a pair of parallel short angle irons 157 and 158 interconnecting the angle irons 155 and 156 but being welded thereto buttwise at right angles. It will also be noted that a pair of openings 159 and 160 are provided in the vertical web or body portion of channel iron 141 to provide for the passage therethrough of the drive rope portions P₁ and P₂.

Figure 11:
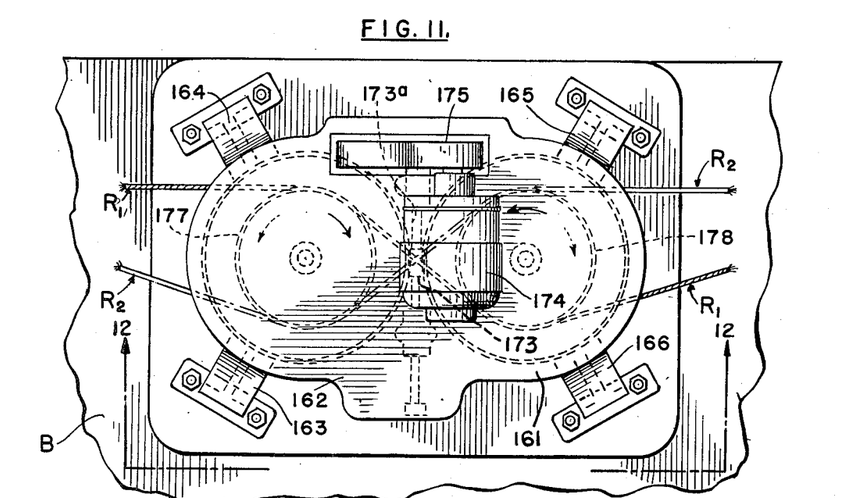
Figure 11 is an enlarged top view of the motorized rope drive unit shown in Figures 1 and 2, such top view being taken on line 11—11 in Figure 2.
Figure 12:
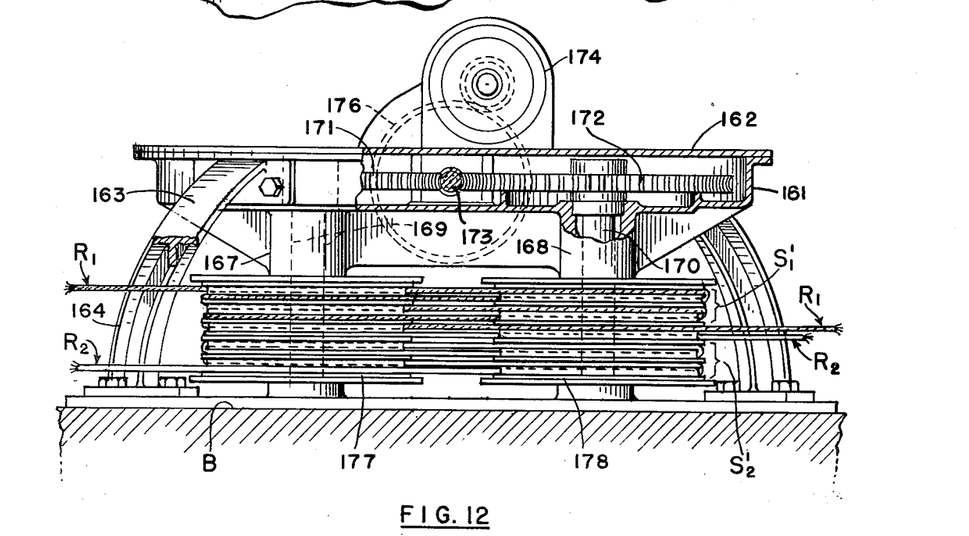
Figure 12 is a side view of the motorized rope drive unit taken on line 12—12 of Figure 11.

According to Figures 11 and 12 presenting a greatly enlarged detail showing of the rope drive unit indicated at 22 of Figures 1 and 2, that unit comprises a casing 161 of shallow pan-shaped form closed by a top cover plate 162 fastened to the casing 161. The casing 161 has legs 163, 164, 165, 166 whereby the unit is firmly supported and anchored upon its base "B" at the top of the near-end portion of the tank. The casing 161 is formed with a pair of vertical hub portions 167 and 168 extending from the bottom thereof, in which hub portions is rotatable a pair of vertical shafts 169 and 170 respectively, which shafts have fixed upon their upper ends the worm gears 171 and 172 respectively contained in casing 161 and driven by a common worm 173 on worm shaft 173ª which is rotatably mounted in the casing 161. Upon the cover 162 are mounted a drive motor 174 with a gear or pinion 175 meshing with a larger gear 176 fixed upon the worm shaft 173ª and driving the worm gears 171 and 172. Upon the lower ends of the vertical shafts 169 and 170 are fixed the rope drive drums 177 and 178 respectively engaged by 8-shaped windings of the drive rope in the manner of the two groups of 8-shaped windings S₁ and S₂ diagrammatically shown in Figure 3 and discernible in Figure 12 by the designations S₁' and S₂' respectively.

While the operation of the sediment raking mechanism with its rope tension compensating device is largely evident from the foregoing description, it may be added that the rope tension compensating device in operation is capable of compensating for unbalancing forces that may tend to interfere with the proper parallel motion progress of the carriage. For example, when the resistance to the carriage movement occurs relatively greater at one side thereof, say at the side wall 98, in other words when that side of the carriage is overloaded relative to the opposite side, then as the overloaded side of the carriage tends to lag behind, the effect at once transmits itself through the respective auxiliary frame 108 and linear transmitting element 125 to the torque member 118. The result is that the linear element 120 absorbs a relatively greater share or even all of the tension weight "F" whereas the opposite linear element 121 absorbs a minor share or else none, so that there is exerted a proportionately greater relative rope tension pull upon the overloaded side of the carriage, to the extent that continued parallel motion progress of the carriage is assured.

I claim:

1. For use with a longitudinal rectangular settling tank, a sediment raking device having a wheeled rake-carrying frame extending transversely of the tank and with its sides operatively supported upon tracks provided at and along the top of the respective side walls of the tank and movable back and forth between the ends of the tank; rope drive mechanism for moving said frame, which comprises a complete and in effect endless length of rope providing a pair of driving loops one along each side of the tank, with homologous portions of said loops being anchored upon respective sides of the wheeled frame for bodily moving the same upon the tracks by the linear movement of the rope, the course of each said loop being defined by a respective far end corner pulley at the far end of the tank and by a respective pair of near-end corner pulleys at the near end of the tank, a stationary rope drive unit provided at the rear end of the tank and operatively engaging said rope in a manner to impart the identical rate of movement to the rope in each loop and thereby to impart said movement to said frame, and rope tension compensating means comprising a movable guided auxiliary frame for each said loop to carry the respective pair of near end pulleys and bodily movable for tensioning said loop, and pull exerting weight means together with pull transmitting means between said weight means and said auxiliary frames for applying outward rope-tensioning pull and movements to said auxiliary frames, which pull-transmitting means comprise a first operative connection between said weight means and the one auxiliary frame, and a second operative connection between said weight means and the other auxiliary frame, whereby each connection is adapted to transmit to its respective auxiliary frame a share of the effective total rope tensioning pull of said weight means substantially in the inverse proportion to any potential slacking of its associated loop of drive rope, caused by potential relative slippage of one side of the carriage frame with respect to the other side, so that compensatory movement is imparted to each auxiliary frame in a manner to maintain parallel motion progress of the carriage frame incident to the operation of the drive rope mechanism.

2. The rope drive mechanism according to claim 1, in which the rope drive unit comprises a pair of driven rotary drums rotatable about parallel vertical axes said drums being provided with parallel rope receiving grooves, and the complete length of rope comprises a first section and a second section complementary with respect to the first section, said first section of rope comprising a length extending from a first anchoring point at one side of the wheeled frame and along the adjacent side of the tank to and about one of the associated first pair of near end corner pulleys, thence engaging said pair of drums in a first group of 8-shaped windings thereon, thence to and about one of the second pair of near end corner pulleys, thence along the associated side of the tank to and about the associated far end corner pulley, thence to a second anchoring point upon the associated side of the wheeled frame; said second section comprising a length extending from said second anchoring point to and about the other one of the associated second pair of near end corner pulleys, thence engaging said pair of drums in a second group of 8-shaped windings thereon, thence to and about the other one of the first mentioned pair of near end corner pulleys, thence along the associated side of the tank to and about the associated far end corner pulley to said first anchoring point upon the associated side of the frame.

3. The rope drive mechanism according to claim 1, and in which the operative connections between the weight means and said auxiliary frames comprise a rotary torque member mounted stationary at the near end of the tank and having a vertical axis of rotation, a force transmitting connection between said weight means and said torque member for imparting thereto a torque of a desired magnitude, and a pair of linear flexible torque absorbing connectors extending in opposite directions from said torque member to respective auxiliary frames.

References Cited in the file of this patent

UNITED STATES PATENTS

| Number | Name | Date |
|---|---|---|
| 1,650,820 | Coe | Nov. 29, 1927 |
| 1,773,479 | Escher | Aug. 19, 1930 |
| 2,003,261 | Lund | May 28, 1935 |
| 2,101,080 | Lund | Dec. 7, 1937 |